May 5, 1964     R. W. KING     3,131,906
VALVE SEAT

Filed Nov. 17, 1960     3 Sheets-Sheet 1

*INVENTOR.*
RUDY WILLIAM KING

BY *Head & Johnson*

ATTORNEYS

May 5, 1964   R. W. KING   3,131,906
VALVE SEAT
Filed Nov. 17, 1960   3 Sheets-Sheet 2

INVENTOR.
RUDY WILLIAM KING
BY
Head & Johnson
ATTORNEYS

May 5, 1964 R. W. KING 3,131,906
VALVE SEAT

Filed Nov. 17, 1960 3 Sheets-Sheet 3

INVENTOR.
RUDY WILLIAM KING
BY
Head & Johnson
ATTORNEYS

United States Patent Office 3,131,906
Patented May 5, 1964

3,131,906
VALVE SEAT
Rudy W. King, Tulsa, Okla., assignor to Orbit Valve Company, Tulsa, Okla., a corporation of Oklahoma
Filed Nov. 17, 1960, Ser. No. 69,930
4 Claims. (Cl. 251—360)

This invention relates to valves. More particularly, the invention relates to a novel type valve seat having a relatively resilient extruded element integrally formed therein in such a way that the element is not dislodged even when the valve in which the seat is used is subjected to extremely high pressures.

It has been recognized in valve construction and operation that an efficient sealing occurs when a resilient member is interposed between metal seating components. The reasons for this are many, and include: First, any slight irregularities in the matched seating surfaces are absorbed by resilient material; second, any solid materials which are flowing through the valve and which adhere to the seating surface, such as rust particles, serve to hold or prop open metal surfaces whereas resilient seating surfaces can absorb these foreign particles and still provide a leak proof seal; and third, resilient members are able to compensate for wear and continue to provide leak proof valve closures. Because of these advantages it is highly desirable that at least one surface of the seating components in a valve be of resilient material.

When valves are used for low pressure applications it is not difficult to provide such resilient surfaces. Valves have been designed having a simple O-ring groove with an O ring inserted in the groove. The resilient surface provided by an O ring works satisfactorily when the pressures to which the valve is subjected are low. As working pressures increase, it is found to be difficult to provide a resilient seat in the valve which will not be dislodged by high pressures. This is particularly true in a valve arrangement wherein the spherical or convex valve core axially moves out of engagement with the valve seat and rotates to the full open position.

When such a valve is opened under extreme pressures, i.e., the core is moved axially away from the seat, a pressure differential exists across the seat. This tends to pull the resilient member away from its normal position. In some instances the member becomes dislodged or follows the core and hence is inoperable for future use.

Accordingly, it is an object of this invention to provide a valve seat and method for making same that will overcome the objections and problems heretofore known concerning high pressure valve systems, and to further provide for efficient closing of the valve core with respect to its seat to prevent leakage.

Another object of this invention is to provide a valve seat having a resilient member formed therein which will not be dislodged by high pressures within the valve.

Another object of this invention is to provide a resilient element for positioning in a valve seat which does not require continuous contact with the valve core in order to remain in proper position relative to the seat.

Another object of this invention is to provide a valve seat having an extruded and relatively resilient member wherein the seating surface forms an integral and continuous arcuate surface for engagement with the core of the valve.

Another object of this invention is to provide a method of forming a valve seat having an integrally formed resilient member wherein the seating surface of the valve seat has a spherical external configuration and wherein the exposed surface of the resilient member forms a portion of the spherical surface.

These and other objects and a better understanding of the invention may be had from the following description and claims when taken in conjunction with the attached drawings in which:

*Description*

Figure 1:
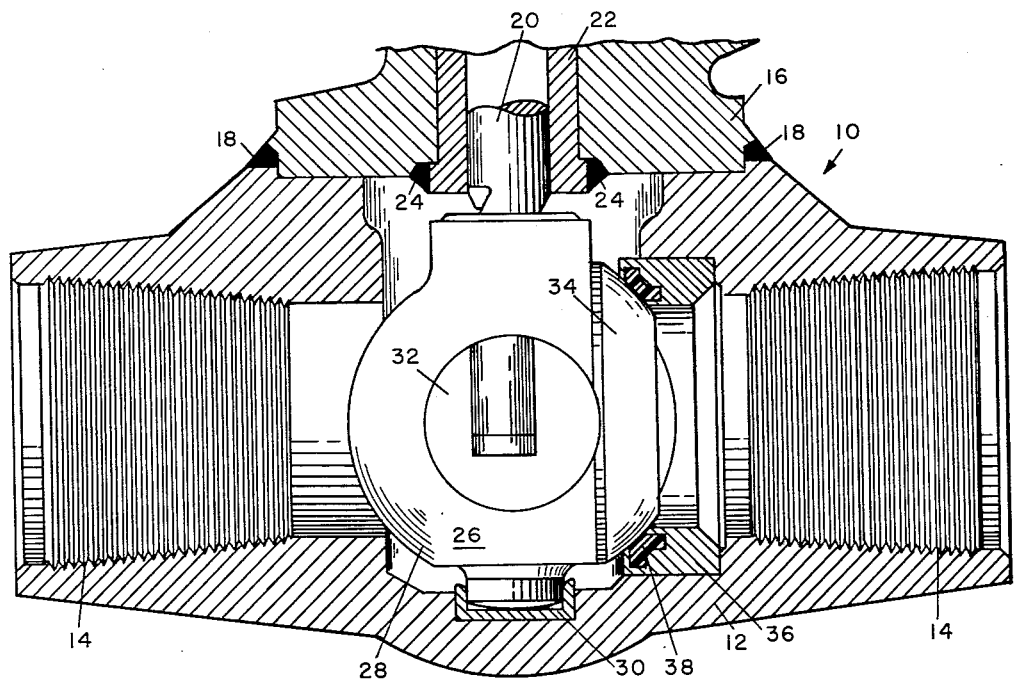
FIGURE 1 is a view partly in cross-section and partly in elevation of a typical valve arrangement utilizing the improved valve seat of this invention.

Referring now to the drawings, and first to FIGURE 1, a cross-section of a valve typical of use with this invention and, indicated generally by the numeral 10, is shown. Valve body 12 is provided with threads 14 on each end thereof to receive conduit within which the valve is inserted. Threads 14 may be replaced by flanges, not shown, or by any other types of connection devices to mount the valve in a line.

The upper bonnet 16, shown only fragmentarily, is welded to body 12 at welded junction 18. Bonnet 16 extends upward and includes provision for a handle or crank (not shown) which serves to operate valve stem 20. The valve stem 20 is positioned in bushing 22 which is welded to bonnet 16 at welded junction 24. Bushing 22 functions to hold valve stem 20 in alignment. Packing, gaskets or O rings (not shown) may be provided between the valve stem 20 and bonnet 16 in various arrangements to prevent any fluid leakage out of the valve.

A valve core 26 is the working member which serves to close and open the valve 10 and either, according to its position, to permit or prevent flow of fluids through the valve. Valve core 26 is rotated about lower pivot point 28 which is seated in and engages pivot bushing 30. Opening 32 in valve core 26 permits fluids to flow substantially uninterupted axially though the valve when it has been rotated approximately 90° to coincide with the axial opening through the valve body. A convex annular seating face 34 is formed on the surface of valve core 26. Seating face 34 may be either integrally formed with the valve core 26 or may be a hardened element affixed by welding, etc. A valve seat, indicated generally by the numeral 36, is formed separately of the body 12 and fitted into position to be engaged by the seating face 34 of core member 26. An extruded, resilient member 38 is formed in the contacting surface of valve seat 36. Seating face 34 engages member 38 to form a fluid tight passage preventing the flow of fluid through the valve.

Figure 9:
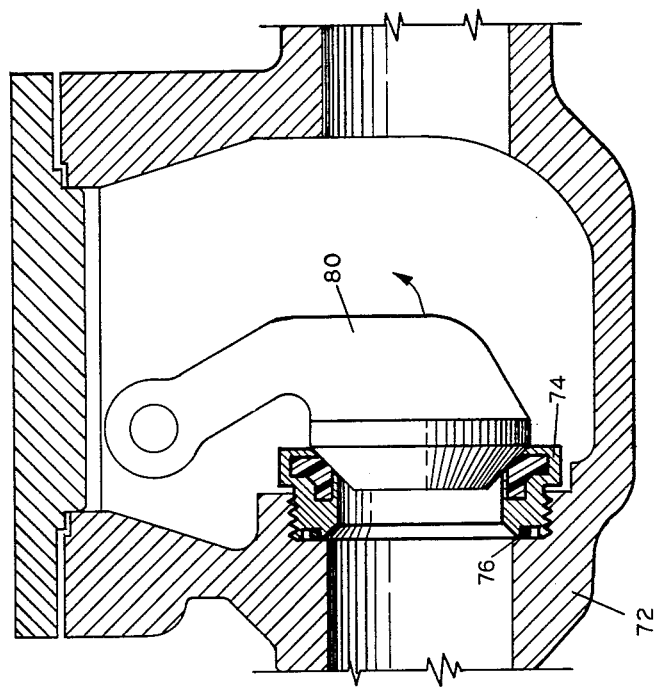
FIGURES 8 and 9 represent additional uses of the valve seat constructed according to this invention, i.e., a globe valve and check valve respectively.
Figure 8:
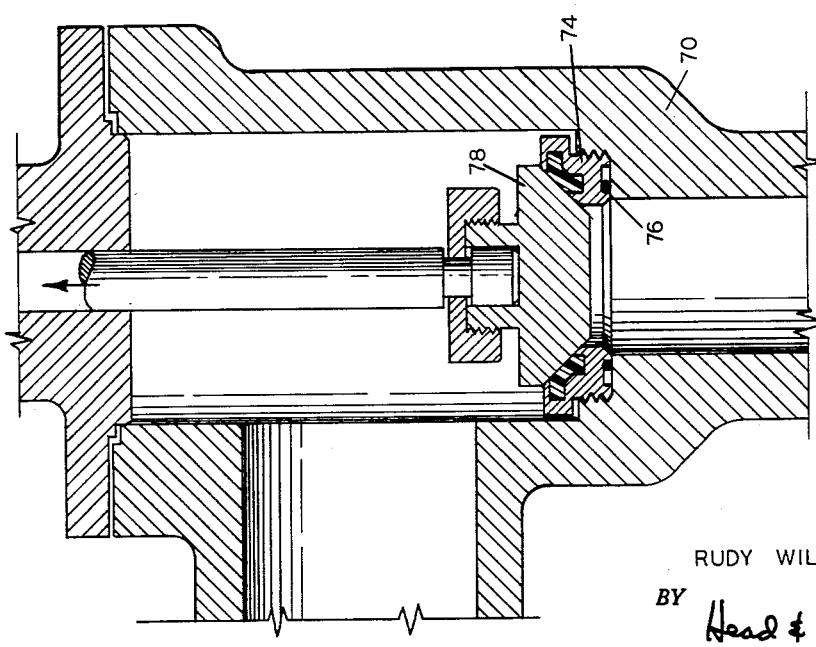

Typically valve 10 is arranged such that operation of valve stem 20 serves not only to rotate valve core 26 90° but to move the valve core 26 axially away from valve seat 36. This lateral movement, coupled with the fact that seating face 34 protrudes at a greater radius than the rest of the valve core 26, provides axial contact between member 38 and the seating face 34. That is, when valve core 26 is rotated approximately 90° and moves toward the valve seat to alter the valve from full opened to full closed position, contact is made with resilient element 38 only at the final closing and initial opening stages. Accordingly, when valve 10 is utilized to control high pressure fluid flow, the first movement of the seating face 34 axially away from resilient element 38, creates a tremendous pressure differential tending to pull the resilient member 38 out of engagement with valve seat 36. One important novelty of this invention lies in the unique formation of member 38 in valve seat 36. This arrangement demonstrates one type of valve in which the valve seat of this invention is particularly applicable and wherein the advantages of the novel configuration of the valve seat of this invention are greatly beneficial. Nevertheless, the arrangement of the valve of FIGURE 1 is given as an example of the preferred embodiment. However, the valve seat 36 of this invention may be utilized with any type of valve wherein a substantially spherical seating surface comes into engagement with the valve seat in order to perform the sealing operation, such as illustrated in FIGURES 8 and 9.

Figure 2:
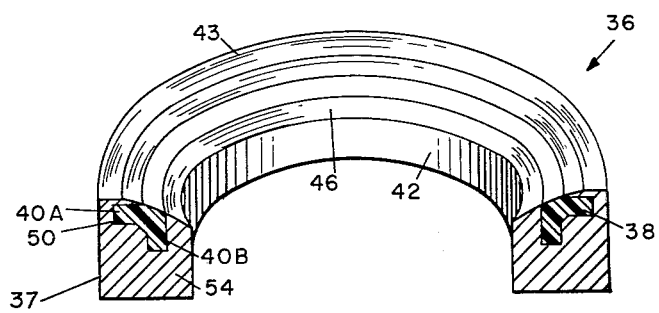
FIGURE 2 is an isometric sectional view of a valve seat having an extruded and resilient member integrally formed therein according to the principles of this invention.

The novel methods and configurations of the valve seat construction of this invention are shown in FIGURE 2. Valve seat 36 is formed of a metal ring or body member 37, whose axial cross-section is substantially rectangular, except for that part forming the seat. The exact cross-sectional shape of valve seat 36 can be altered to comply with the design of the valve in which it is to be utilized. The basic novelty of the invention lies in the design and means in which the extruded and relatively resilient member 38 is positioned within annular groove of body member 37.

Resilient member 38 is composed of a moldable or extrudable material having characteristics of resiliency, deformability and basic chemical inertness. In particular, those materials which when once set in the valve seat configuration of this invention cannot be removed or withdrawn without rupture or failure, are preferred. Semi-elastomeric materials having the characteristics of polymerized tetrafluoroethylene, or of polyamides such as sold under the trademarks Teflon and Nylon respectively are examples.

Figure 3:
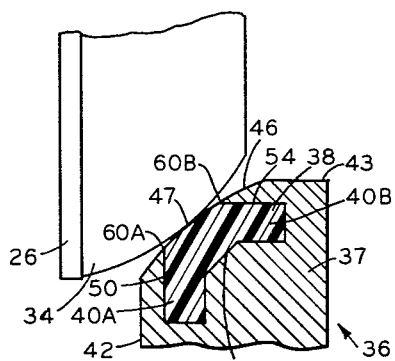
FIGURE 3 is a fragmentary cross-sectional view showing the attitude of engagement of the valve core and valve seat, as constructed according to this invention.

The configuration of member 38 within body member 37 and the attitude with which the valve seat 36 engages seating face 34 of core 26 may best be seen in FIGURE 3. In the formation of valve seat 36, two grooves 40A and 40B are first machined into the body member 37. Preferably, grooves 40A and 40B are machined at substantially right angles to each other. Groove 40A parallels inner face 42 of the tubular body member 37 and is therefore parallel to the tubular axis of valve seat 36. Groove 40B parallels forward end 43 of body member 37 and is perpendicular to the tubular axis of valve seat 36. A third portion, termed an angular groove, 44 is cut into the valve seat 36 at an angle of approximately 45° with respect to grooves 40A and 40B but to a depth less than the depth of grooves 40A and 40B forming angular or beveled shoulder 45. Grooves 40A, and 40B and 44 form a single annular groove which is filled with a resilient material. Seating face 46 is formed across these grooves, is arcuate in cross-section and engages the arcuate seating face 34 of core 26 at a relatively tangential point 47.

Figure 4:
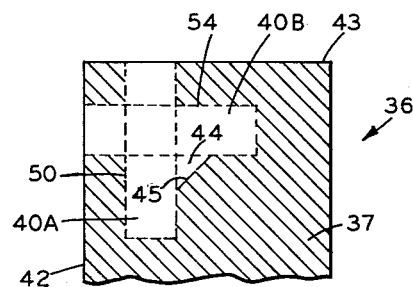
FIGURE 4 is a fragmentary cross-sectional view of a valve seat during the manufacturing process showing the configuration of the grooves formed in the seat body.
Figure 5:
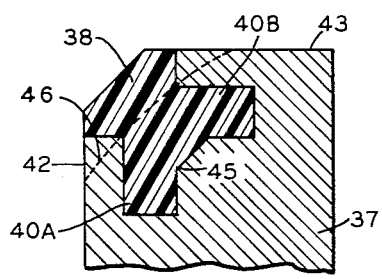
FIGURE 5 is a fragmentary cross-sectional view of a valve seat during the manufacturing process wherein the resilient material has been extruded into position and before the final machining operation wherein the convex seating surface is formed on the valve seat.

The steps in the process of manufacturing valve seat 46 are best shown in FIGURES 4 and 5. After grooves 40A and 40B are formed in valve seat 36 an angular groove 44 is cut in the body member 37 forming beveled shoulder 45 at an angle of approximately 45° with respect to both grooves 40A and 40B. Following these three machining operations the valve body member 37 has a cross-sectional configuration of that shown in FIGURE 5.

At this stage in the process of manufacturing the valve seat of the invention, a material having the properties defined is extruded or molded into the grooves 40A, 40B and 44 to form a configuration similar to that shown in FIGURE 5. The final stage in the manufacturing process is the formation of the seating face 46. The seating face 46 is machined, after the extrusion of member 38 into 40A, 40B and 44 to form a continuous integral, arcuate seating surface.

Beveled shoulder 45 provides a flat surface substantially parallel to the tangent line of the intersection of seating faces 46 and 34. This provides a firm backing for the resiliency of element 38, insuring a controlled, predeterminable degree of resiliency in the engineering of valve seat 36.

Figure 6:
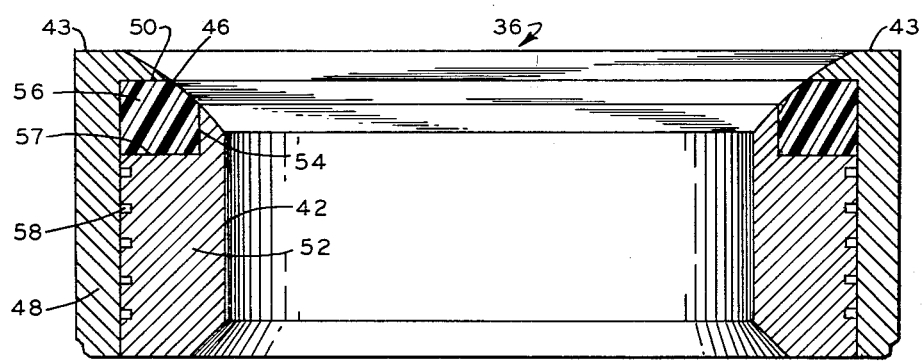
FIGURE 6 is a cross-sectional view of a valve seat formed by an alternate process.

An alternate method of formulating a valve seat according to the principles of this invention is shown in FIGURE 6. An outer ring 48 is provided having an annular lip 50 adjacent the forward surface 43 and seating face 46. Annular lip 50 extends substantially perpendicular to the tubular axis of outer ring 48. An inner ring 52, having an outside diameter substantially equal to the inside diameter of outer ring 48, is provided with an annular lip 54. Annular lip 54 is adjacent the inner surface 42 of inner ring 52 and seating face 46 and extends parallel to the tubular axis of inner ring 52. The annular lips 50 and 54 provide a substantially rectangular or square cross-sectional area into which is positioned a ring of semi-elastomeric material 56. Ring 56 is positioned between the forward surface 57 of inner ring 52 and annular lip 50 of outer ring 48. Annular lip 54 supports and maintains material 56 in this position. The three elements of the valve seat 36 of FIGURE 6 are assembled with inner ring 52 being either expressed or shrunk fitted into outer ring 48.

Figure 7:
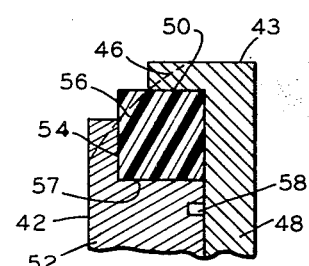
FIGURE 7 is a fragmentary cross-sectional view of the valve seat of FIGURE 6 before the final machining operation.

To further insure strength of the valve seat 36, resins or other sealing materials such as an epoxy resin may be applied between inner ring 52 and outer ring 48. Annular grooves 58 may be machined in the exterior diameter of inner ring 52. The grooves have axes which coincide with the tubular axis of inner ring 52. With resin in grooves 58 the inner ring 52 and outer ring 48, once assembled, will be substantially inseparable. After assembly, the annular lips 50 and 54 have an external appearance similar to that shown in FIGURE 7. The final step in the manufacturing process is the machining of the seating face 46 to a configuration as shown in FIGURE 6.

Valve seats as manufactured under the process shown in FIGURES 4 and 5 have the advantage of being composed of a single metallic body member 37 with the member 38 extruded therein. The valve seat of FIGURE 6 has the advantage that a formed ring of material 56 may be utilized without the extrusion process. The method of manufacturing the valve seat therefore will be selected primarily on the basis of the type of manufacturing equipment available.

FIGURE 3 discloses in detail the seating arrangement of the valve seat 36 with respect to the seating face of valve core 26. Seating face 34 of core member 26, being arcuate or convex, engages a similar arcuate or convex seating face 46 of valve seat 36. Only member 38 makes contact with the seating face 34 under normal conditions. The deformability of the semi-elastomeric member 38 absorbs pressure from seating face 34 and deforms around any irregularities to provide a positive, leak proof seal.

When the valve in which the valve seat 36 of this invention is used is subjected to high pressures, the valve will normally be arranged so that on closing great pressure is applied by seating face 34 against resilient member 38. After long use, if wear occurs in the resilient member 38, the high force exerted against resilient member 38 may cause seating face 34 to engage seating face 46. This provides a metal to metal contact between seating element 36 and seating face 34 such that, even after long use and the wearing away of resilient element 38, a positive, leak proof seal is provided, insuring an extended useful life of the value. Seating face 46 when machined to the configuration shown terminates at relatively sharp edges 60A and 60B which have a degree of flexibility for the above described purpose.

Valve seat 36 may be designed in such a manner that seating surface 34 of core 26 engages edges 60A and 60B even though resilient member 38 has not been worn away to seal the valve against extremely high pressures. It can be seen that the amount of deflection of resilient member 38 required before engagement of seating face 34 and edges 60A and 60B occurs is determined primarily by the radius of arcuate seating faces 34 and 46, that is, the greater the radius of seating faces 34 and 46 the nearer edges 60A and 60B will be to seating face 34 when engagement is first made between seating face 34 and resilient member 38.

The reduction in the thickness of metal at these edges permits a certain flexing of the annular lip portions 50 and 54 when resilient member 38 has worn away to such an extent that valve seating face 34 engages these metal components. This flexing insures a continued leak proof seal. The resiliency of the flexing of annular lips 50 and 54 is augmented by the resilient compressable material 38 in grooves 40A and 40B.

The provision of annular lip portions 50 and 54, both in the valve seat configuration of FIGURE 3 and FIGURE 6, provides means whereby the resilient members 38 and 56 are restrictively retained in the valve seats 36. These configurations permit the valve to be operated at extremely high pressure without failure of the valve due to the resilient member becoming displaced, particularly at the high differential pressures which occur just as the valve is opened.

In FIGURES 8 and 9 a globe valve body 70 and check valve body 72 are adapted to threadably receive valve seat 74 and sealed with respect thereto using O ring 76. Valve cores 78 and 80 are adapted for movement into sealing engagement with the valve seats. The seats 74 are constructed similar to that heretofore described.

Although this invention has been described with a certain degree of particularity, it manifests that many changes may be made in the details of construction and the arrangement of components without departing from the spirit and scope of this disclosure.

I claim:
1. A one piece integral valve seat for placement in a valve having a core for engagement therewith comprising,
   a tubular body portion having an annular seating face adjacent each side of an annular recess in said body portion which opens at said seating face,
   said recess in part defined by a first annular groove portion extending substantially perpendicular to the tubular axis of said body portion and in part by a second annular groove portion extending substantially parallel to the said tubular axis of said body,
   said first and second grooves intersecting to form said opening, and
   a semi-elastomeric material of the type described positioned within said recess and across said opening to form a continuation of said annular seating face and become a primary seating face when said core contacts thereagainst.

2. A valve seat of the type described in claim 1 wherein said primary and annular seating faces define a continuous convex arch.

3. A valve seat of the type described in claim 1 wherein said recess includes a third annular groove portion at an angle of approximately 45° to the tubular axis of said body and intersecting with said first and second grooves.

4. A valve seat for placement in a valve having a core for engagement therewith comprising,
   a tubular body portion having an annular seating face adjacent each side of an annular recess in said body portion which opens at said seating face,
   said recess in part defined by a first annular lip portion extending substantially perpendicular to the tubular axis of said body portion and in part by a second annular lip portion extending substantially parallel to the tubular axis of said body, said first and second lip portions intersecting, if extended, at a point beyond said seating face to form said opening, and
   a semi-elastomeric material of the type described positioned within said recess and across said opening to form a continuation of said annular seating face and become a primary seating face when said core contracts thereagainst.

References Cited in the file of this patent

UNITED STATES PATENTS

| 1,686,849 | Frauenheim | Oct. 9, 1928 |
| 2,516,947 | Blevans | Aug. 1, 1950 |
| 2,626,776 | Martineau | Jan. 27, 1953 |
| 2,665,879 | Housekeeper et al. | Jan. 12, 1954 |
| 2,788,570 | Hoeh | Apr. 16, 1957 |
| 2,815,187 | Hamer | Dec. 3, 1957 |
| 2,875,978 | Kmiecik | Mar. 3, 1959 |
| 2,887,295 | Bredtschneider | May 19, 1959 |
| 2,904,877 | Edelen | Sept. 22, 1959 |
| 2,918,078 | Cummings | Dec. 22, 1959 |
| 2,929,401 | Cowan | Mar. 22, 1960 |
| 2,963,262 | Shafer | Dec. 6, 1960 |
| 3,009,680 | Kaiser | Nov. 21, 1961 |

FOREIGN PATENTS

| 38 | Great Britain | of 1870 |